J. S. De HAVEN.
Seed-Drill Teeth.
No. 35,510.
Patented June 10, 1862.
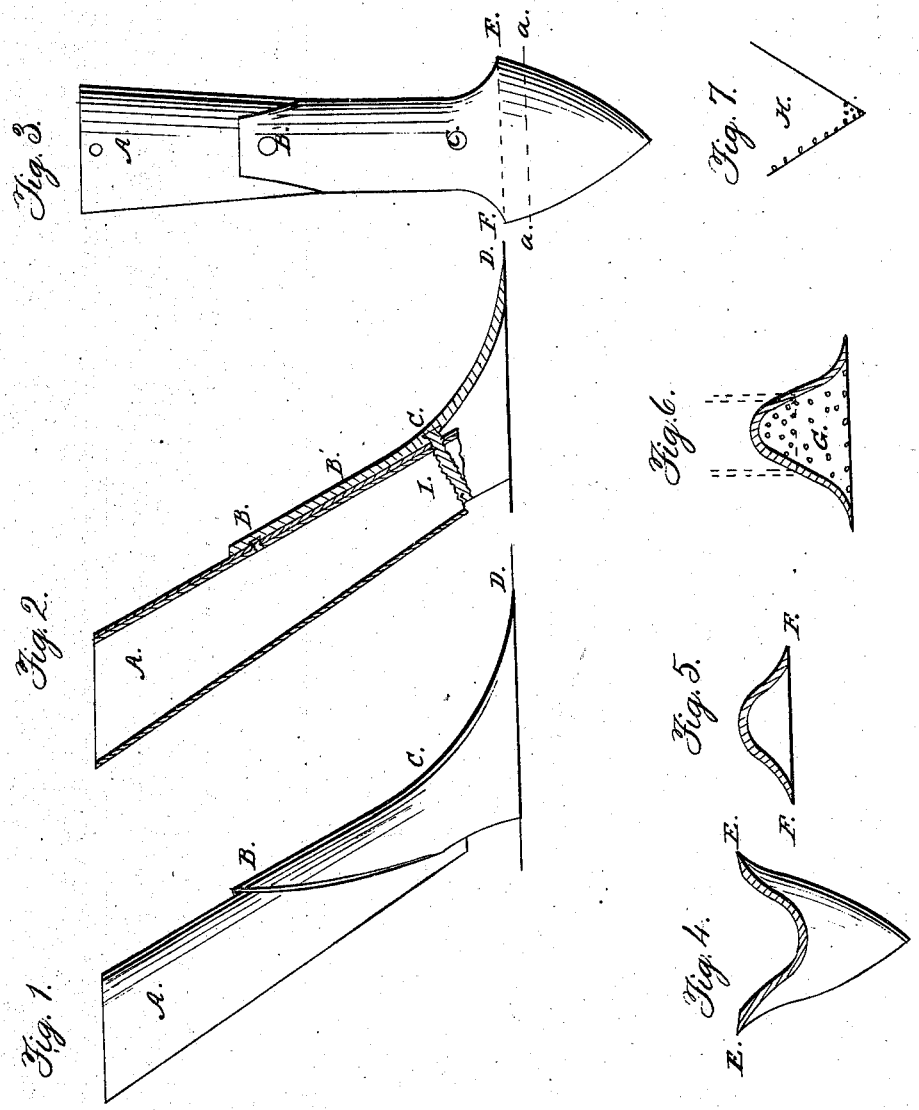

UNITED STATES PATENT OFFICE.

JAS. S. DE HAVEN, OF NORTH SPRINGFIELD, OHIO.

IMPROVEMENT IN GRAIN-DRILLS.

Specification forming part of Letters Patent No. 35,510, dated June 10, 1862.

*To all whom it may concern:*

Be it known that I, JAMES S. DE HAVEN, of North Springfield, in the county of Summit and State of Ohio, have invented a new and useful Improvement in Grain-Drills; and I do hereby declare that the following is a full, clear, and exact description of the construction and operation of the same, reference being had to the accompanying drawings, making part of this specification, in which—

Figure 1 is a side view. Fig. 2 is a vertical section. Fig. 3 is a front view. Fig. 4 is a cross-section on line E E', Fig. 3. Fig. 5 is a section on line $a\,a$, Fig. 3. Fig. 6 is a cross-section of the furrow and lower part of tooth, showing the shape of the bottom of the furrow and distribution of the grain.

In the drawings, A, Figs. 1, 2, and 3, represents a sheet-iron tube, through which the grain is conveyed to the bottom of the drill-furrow. This tube is cylindrical and a little tapering toward the bottom, the upper end being about two and a half inches in diameter and the lower end about two inches, the length being about one foot. The steel front or drill-tooth proper is secured to the tube by the rivet B and seed-spreading bolt I. That portion of the steel front above the bolt I fits snugly to the cylinder A. The front is polished smoothly, so that the soil will not stick to it. From C the tooth curves gently downward and forward to the point D, making the tooth from B' to D concave in the line of its vertical section, as seen in Fig. 3. From C the tooth expands in nearly a straight line to E E', the distance being from E to E' about four inches. The distance from C to D in a straight line is about five inches. The edges of the blade from E to D and from E' to D are curved outward slightly and made sharp, as at F, Fig. 5, which is a section on the line $a\,a$, Fig. 3. The upward curve of the tooth is shown in Fig. 4, at E E', D being a section from E to E' in Fig. 3. When the tooth is in its position for work the cutting-edges E D E' are nearly or quite horizontal. Consequently the bottom of the furrow beneath the tooth before the soil falls back is level, as seen in Fig. 6, and consequently the seeds are scattered broadcast thereon by the spreading-bolt, as seen in Fig. 6, at G. Besides, the blades, being sharp, will cut their way through roots or hard ground with ease. The advantage this form of tooth possesses over those in common use is shown by a comparison with Fig. 7, which shows the seeds collected in a close furrow, as at H, instead of being broadly distributed, as at G, Fig. 6.

The seed as it drops falls upon the bolt I, which extends across the opening in the bottom of tube A, as seen in Fig. 2, and is by that scattered over the entire plane surface formed by the peculiar shape of the tooth, as fully indicated in Fig. 6.

I do not claim the use of a spreading-bolt, for such a device is found in A. A. Dailey's rejected application of 1852; but

What I claim, and desire to secure by Letters Patent, is—

The combination of the inclined and tapering metal tube A with the peculiarly-shaped metal tooth represented in the accompanying drawings, and the spreading-bolt I, constructed, combined, and arranged in relation to each other as shown and described.

JAMES S. DE HAVEN.

Witnesses:
J. BRAINERD,
W. H. BURRIDGE.